US007508641B2

(12) United States Patent
Ball et al.

(10) Patent No.: US 7,508,641 B2
(45) Date of Patent: Mar. 24, 2009

(54) METHOD OF FORMING AN IN-RUSH LIMITER AND STRUCTURE THEREFOR

(75) Inventors: Alan R. Ball, Gilbert, AZ (US); Stephen P. Robb, Fountain Hills, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 283 days.

(21) Appl. No.: 11/144,417

(22) Filed: Jun. 6, 2005

(65) Prior Publication Data

US 2006/0274557 A1 Dec. 7, 2006

(51) Int. Cl.
*H02H 3/00* (2006.01)

(52) U.S. Cl. .......................... 361/100; 361/58; 323/299

(58) Field of Classification Search .................. 361/18, 361/91, 90, 100, 115, 58, 56, 111; 323/272-277; 363/72, 98, 65
See application file for complete search history.

(56) References Cited

U.S. PATENT DOCUMENTS 4,176,398 A * 11/1979 Rider ............................ 708/8
5,374,887 A * 12/1994 Drobnik ...................... 323/299
6,525,515 B1 * 2/2003 Ngo et al. .................... 323/277
6,559,623 B1 * 5/2003 Pardoen ....................... 323/274
6,781,502 B1 8/2004 Robb
6,917,504 B2 * 7/2005 Nguyen et al. .............. 361/100

OTHER PUBLICATIONS

"NIS5101 SMART HotPlug IC/Inrush Limiter Circuit Breaker", Data Sheet, Semiconductor Components Industries, L.L.C., Feb. 2005—Rev. 15, pp. 1-13.

"NIS5102 Advance Information SMART HotPlug IC/Inrush Limiter Circuit Breaker", Data Sheet, Semiconductor Components Industries, L.L.C., Apr. 2005—Rev. P4, pp. 1-9.

"Hot-Plug Protection Circuit ", IBM Technical Disclosure Bulletin, vol. 32, No. 9B, Feb. 1990, IBM Corp., pp. 424-429.

* cited by examiner

*Primary Examiner*—Rajnikant B Patel
(74) *Attorney, Agent, or Firm*—Robert F. Hightower

(57) ABSTRACT

In one embodiment, an in-rush limiter is configured to control an output voltage to increase at a rate that is independent of the load that is powered by the in-rush limiter.

13 Claims, 2 Drawing Sheets

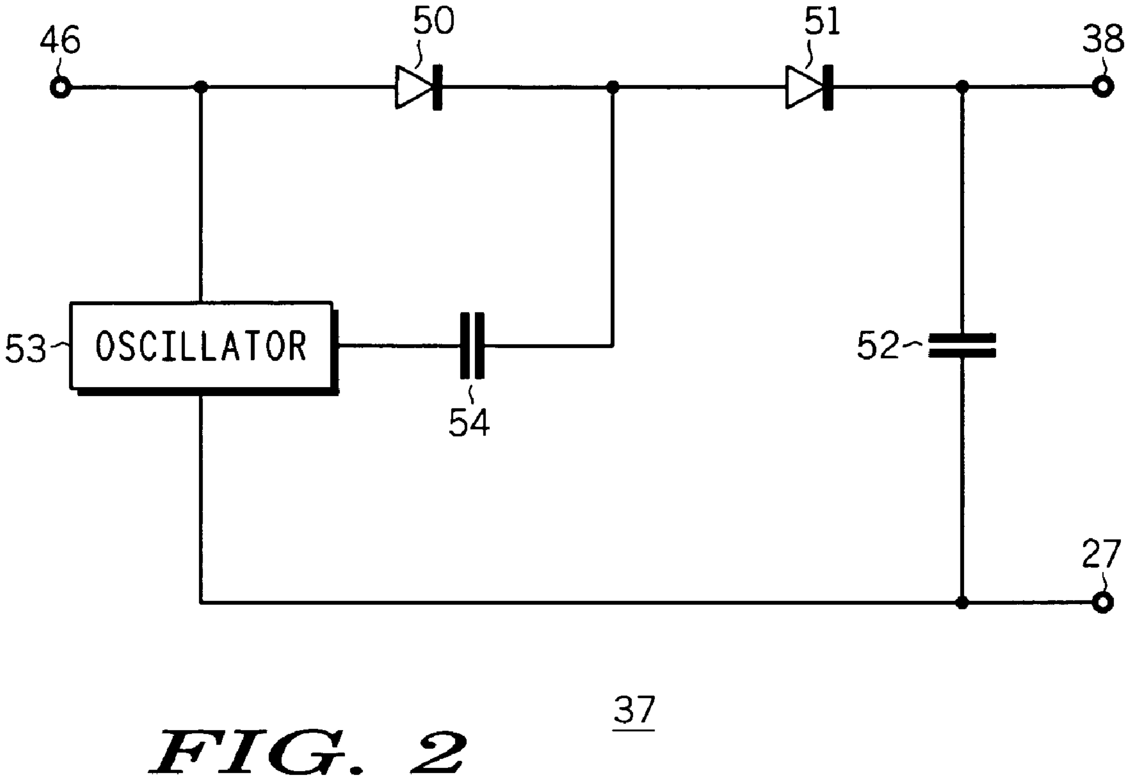
*FIG. 2*
*FIG. 3*
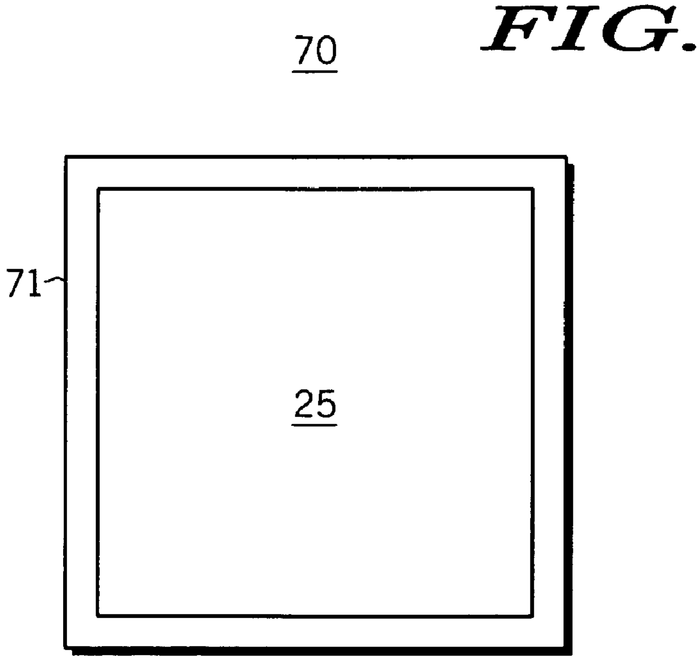

METHOD OF FORMING AN IN-RUSH LIMITER AND STRUCTURE THEREFOR

BACKGROUND OF THE INVENTION

The present invention relates, in general, to electronics, and more particularly, to methods of forming semiconductor devices and structure.

In the past, the electronics industry utilized various methods and devices to protect circuits from voltage transients. In some applications, it was desirable to plug or unplug electronic circuits from their power source without removing the power. This may have occurred when a circuit card was inserted or removed from a small system such as a personal computer or from a large system such as a telecommunications system that may have a large rack full of electronic cards. Cards often were removed and re-inserted without powering down the entire system. These situations were referred to as "hot swap" or "hot plug" applications since the power lines remained "hot" during the transfers.

One example of a hot swap circuit for controlling the voltage applied to the power bus of a card during a hot swap event was disclosed in U.S. Pat. No. 6,781,502 that was issued to Stephen Robb on Aug. 24, 2004 which is hereby incorporated herein by reference. During hot swap events, it generally was desirable to slowly couple the input power to the power bus of the card that was being plugged in during the hot swap event. However, most hot swap controllers did not sufficiently limit the rise time of the voltage on the power bus of the card. Such rapid rise times caused disturbances on the power bus which could result in damaged components or a system crash.

Accordingly, it is desirable to have a hot swap control method and circuit that provides a long rise time for the voltage that is applied to the power bus of a card during a hot swap event.

BRIEF DESCRIPTION OF THE DRAWINGS

FIG. 2 schematically illustrates a portion of an embodiment of some of the circuits of the in-rush limiter of FIG. 1 in accordance with the present invention; and FIG. 3 schematically illustrates an enlarged plan view of a semiconductor device that includes the in-rush limiter of FIG. 1 in accordance with the present invention.

Figure 1:
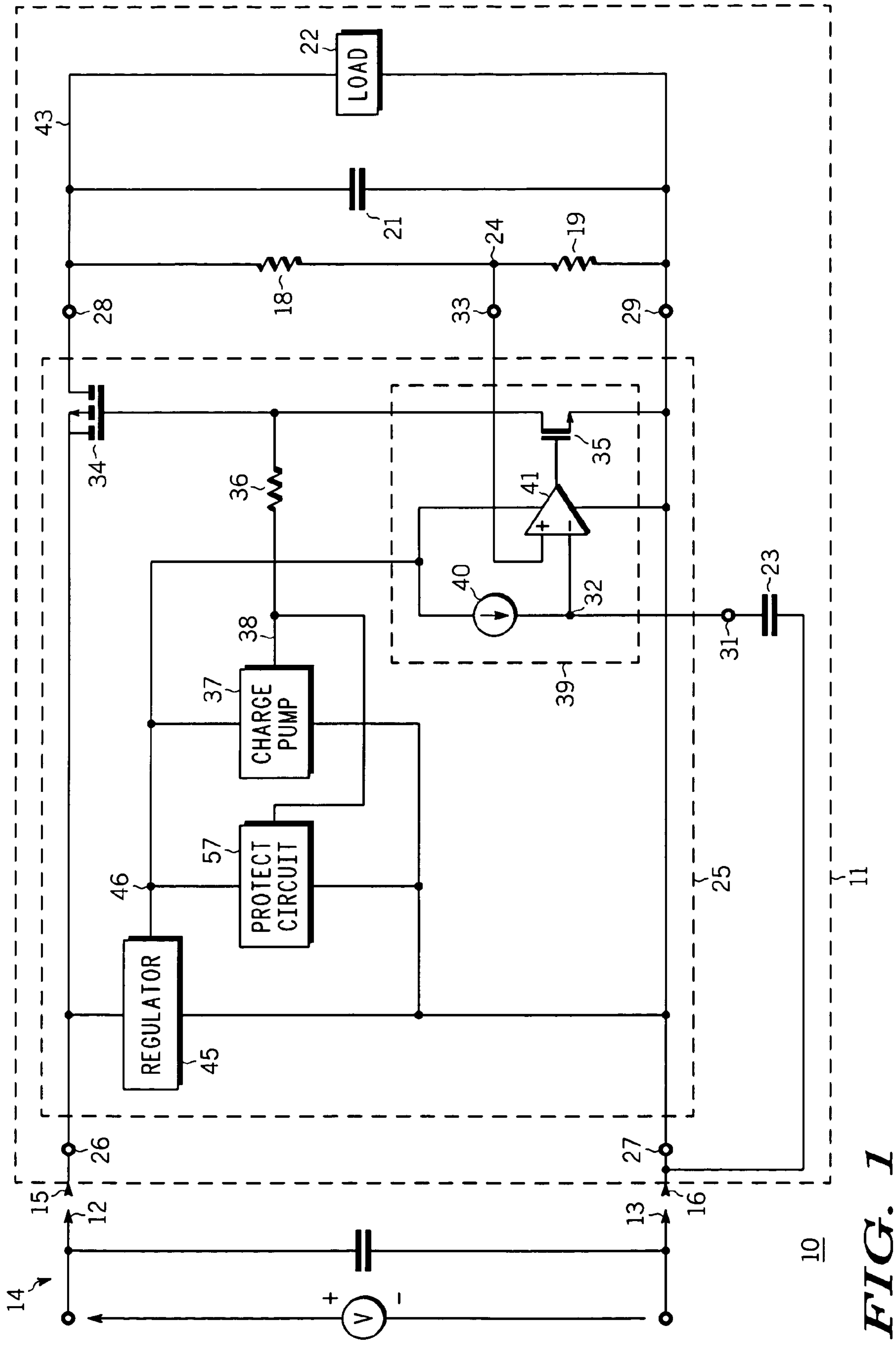
FIG. 1 schematically illustrates an embodiment of a portion of system that includes an in-rush limiter for hot swap events in accordance with the present invention.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of a MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

FIG. 1 schematically illustrates a portion of an embodiment of a system 10 that includes a system card 11 that has an in-rush limiter 25. System 10 generally includes a main system bus 14 that has a variety of cards such as card 11 plugged into or mated to bus 14. Main system bus 14 is identified in a general manner by an arrow. Main system bus 14 includes a power source terminal 12 and a power return terminal 13 that are utilized to provide power to card 11. Typically, a voltage source is applied between terminals 12 and 13 at a point somewhere along main system bus 14. The voltage source typically is a dc voltage. Card 11 generally has a power input terminal 15 and a power return terminal 16 that are configured to plug into or mate to main system bus 14 and mate with terminals 12 and 13 in order to provide a source of voltage and power to card 11. Card 11 generally includes limiter 25, a load 22, an internal power bus 43, an energy storage capacitor 21 that assist in providing a stable voltage to bus 43 and to a load 22. Load 22 may be a variety of circuits that are configured on card 11 to perform desired functions such as a modem function or a local area network function or the like. A sense network of card 11 includes resistors 18 and 19 coupled as a resistor divider that forms a sense signal at a sense node 24 that is representative of the value of the voltage on bus 43. Limiter 25 is configured to slowly increase the value of the voltage applied to bus 43 independently of load 22 or the amount of current that is required to operate load 22.

Limiter 25 generally receives the voltage from the voltage source as an input voltage between a voltage source input 26 and a voltage source return 27. Input 26 typically is connected to terminal 15, and return 27 typically is connected to terminal 16. Limiter 25 receives the input voltage and forms an output voltage between an output 28 and output return 29. Return 29 typically is connected to return 27. The output voltage on output 28 forms the voltage on bus 43. Limiter 25 receives the input voltage and responsively controls the rise time of the output voltage at a rate that is independent of load 22 or the value of the current required to operate load 22. Limiter 25 includes a control circuit 39, a pass transistor 34, and a charge pump circuit or charge pump 37. Limiter 25 also has a sense input 33 that is used to receive the sense signal from node 24 and a ramp control terminal 31. Limiter 25 may also include a protection circuit 57 that includes circuitry to protect Limiter 25 for conditions such as under-voltage, over-voltage, and over temperature protection. Circuits to implement such under-voltage, over-voltage, and over temperature protection functions are well known to those skilled in the art. Limiter 25 typically includes an internal regulator 45 that receives the input voltage on input 26 and forms an internal voltage on an output 46 that is utilized for operating some of the elements of limiter 25 including circuit 39 and charge pump 37. A gate resistor 36 forms a filter with the gate capacitance of transistor 34 that limits the rate of increase of the gate voltage of transistor 34. The signal from resistor 36 generally has a waveshape that approximates an exponential shape although other waveshapes may also be used. However, it generally is desirable to control the gate voltage to an even lower rate.

As card 11 is mated to system bus 14 at terminals 12 and 13, card 11 begins to receive power between terminals 15 and 16. As the value of the input voltage between input 26 and return 27 begins increasing from zero, charge pump 37 is initially inactive. Therefore, the voltage at an output 38 of charge pump 37 is initially zero, transistor 34 is disabled, and the output voltage between output 28 and return 29 is also approximately zero. As the value of the input voltage between input 26 and return 27 increases above the threshold of regulator 45, the internal voltage on output 46 of regulator 45 begins to increase. When the value of the voltage on output 46 is greater than the voltage required to initiate operation of charge pump 37, charge pump 37 begins to apply a voltage on output 38. Resistor 36 forces the value of the voltage on the gate of transistor 34 to increase at a slower rate than the voltage on output 38. Current source 40 and an external capacitor 23 function as a ramp generator that generates a reference signal on a reference node 32. Current source 40 may be a constant current source that charges an external capacitor 23 with a constant current and forms a resulting linearly varying ramp signal for the reference signal on node 32. In the preferred embodiment, the ramp signal is a ramp voltage. The slope of the ramp signal is determined by the value of capacitor 23 and the current supplied by source 40. In one embodiment, source 40 provides a current of approximately eighty (80) micro-amps. If the value of capacitor 23 is approximately one (1) micro-farad, then a ramp signal with a slope of approximately eight (8) volts per one hundred (100) milliseconds is formed at node 32. In other embodiments, source 40 may be a variable current source or other type of current source that provides other values for the charging current and other values of capacitor 23 may also be used. Additionally, the reference signal on node 32 may have other varying waveshapes instead of a linearly varying ramp signal. An amplifier 41 receives the sense signal from input 33 and the reference signal from node 32 and responsively forms a control signal on an output of amplifier 41. The control signal varies at a rate that is determined by the rate of variation of the reference signal, thus, the control signal varies at a rate that is independent of load 22 and independent of the value of the current required to operate load 22. For the example embodiment of the linearly increasing ramp reference signal, the control signal increases linearly. The control signal is used to control transistor 34 to generate the output voltage on output 28 so that the output voltage varies correspondingly to the reference signal. For the example embodiment of the linearly increasing ramp reference signal, the output voltage also increases linearly with time and has a ramp waveshape. The control signal from amplifier 41 is utilized to control the value of the voltage applied to the source the transistor 34 and thereby force the output voltage to vary at the same rate as the reference signal. If the value of the voltage from resistor 36 increases faster than the control signal, amplifier 41 controls the gate voltage of transistor 35 to force the gate voltage of transistor 34 to follow the same curve as the reference signal. Consequently, the value of the output voltage is controlled to follow:

$$Vout=Vref*((R19+R18)/R19)$$

Where;

Vout—the output voltage

Vref—the value of the reference signal on node 32,

R19—the value of resistor 19, and

R18—the value of resistor 18.

In order to implement this functionality for limiter 25, regulator 45 is connected between input 26 and return 27. Charge pump 37 is connected between output 46 of regulator 45 and return 27, and output 38 is connected to a first terminal of resistor 36. A second terminal of resistor 36 is connected to the gate of transistor 34 and to the drain of transistor 35. A source of transistor 35 is connected to return 27 and return 29. A gate of transistor 35 is connected to the output of amplifier 41. Amplifier 41 is connected to receive power between output 46 of regulator 45 and return 27. An inverting input of amplifier 41 is commonly connected to the output of current source 40, node 32, and terminal 31. An input of current source 40 is connected to output 46. A non-inverting input of amplifier 41 is connected to input 33. A source of transistor 34 is connected input 26 and a drain of transistor 34 is connected output 28. A first terminal of resistor 18 is connected to output 28 and a second terminal is connected to input 33. A first terminal of resistor 19 is connected to input 33 and a second terminal of resistor 19 is connected to return 29.

FIG. 2 schematically illustrates a portion of an exemplary embodiment of charge pump 37 of limiter 25 of FIG. 1. Charge pump 37 receives the internal operating voltage from output 46. An oscillator 53 provides a train of pulses that switches between the potential on return 27 and the potential received from output 46. The output of oscillator 53 charges a pump capacitor 54 which in turn charges an output capacitor 52 to produce an output voltage between output 38 and return 27. The output voltage is a voltage approximately equal to the voltage on output 46 of regulator 45 plus the voltage of the pulses of oscillator 53. Those skilled in the art will appreciate that the charge pump 37 may have other well-known embodiments.

FIG. 3 schematically illustrates an enlarged plan view of a portion of an embodiment of a semiconductor device 70 that is formed on a semiconductor die 71. Limiter 25 is formed on die 71. Die 71 may also include other circuits that are not shown in FIG. 3 for simplicity of the drawing. Limiter 25 and device 70 are formed on die 71 by semiconductor manufacturing techniques that are well known to those skilled in the art.

In view of all of the above, it is evident that a novel device and method is disclosed. Included, among other features, is controlling an output voltage of an in-rush limiter for hot-swap applications to increase at a rate that is independent of the load and the current required to operate the load. In the preferred embodiment, the output voltage is controlled to increase linearly responsively to a ramp shaped reference signal.

While the invention is described with specific preferred embodiments, it is evident that many alternatives and variations will be apparent to those skilled in the semiconductor arts. For example, limiter 25 is illustrated as a high-side controller but those skilled in the art will appreciate that controller 25 may also be implemented as a low-side controller. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A hot swap in-rush limiter comprising:

a pass transistor configured to couple a voltage from a voltage source to form an output voltage on an output of the hot swap in-rush limiter; and a control circuit operably coupled to form a linearly varying reference signal and responsively control the pass transistor to linearly increase the output voltage at a rate that is independent of a current supplied through the pass transistor to a load, the control circuit including a ramp generator coupled to generate the linearly varying reference signal as a ramp signal that increases linearly with time, an amplifier coupled to receive a sense signal representative of the output voltage and compare the sense signal to the ramp signal, and a control transistor coupled to receive an output of the amplifier and control the pass transistor to increase the output voltage responsively to the ramp signal.

2. The hot swap in-rush limiter of claim 1 further including a charge pump circuit coupled to provide a drive voltage for the pass transistor.

3. The hot swap in-rush limiter of claim 1 wherein the hot swap in-rush limiter is formed on a single semiconductor substrate and wherein the control circuit is configured to use a capacitor that is external to the single semiconductor substrate to form the linearly varying reference signal.

4. The hot swap in-rush limiter of claim 1 wherein the voltage from the voltage source is a dc voltage.

5. The hot swap in-rush limiter of claim 1 wherein the control circuit operably coupled to form the linearly varying reference signal and responsively control the pass transistor to linearly increase the output voltage includes the control circuit operably coupled to control the pass transistor to linearly increase the output voltage responsively to receiving the voltage from the voltage source.

6. The hot swap in-rush limiter of claim 1 wherein the control transistor has a first current carrying electrode coupled to a control electrode of the pass transistor, a second current carrying electrode coupled to a voltage return, and a control electrode;

the ramp generator has an output configured to generate a linearly increasing reference signal; and the amplifier has a first input coupled to receive the reference signal, a second input coupled to receive the sense signal, and an output coupled to provide an output of the amplifier to the control electrode of the control transistor.

7. A method of forming a hot swap in-rush limiter comprising:

configuring a pass transistor to couple a voltage from a voltage source to form an output voltage on an output of the hot swap in-rush limiter;

configuring a ramp circuit to form a ramp signal; and configuring the hot swap in-rush limiter to use the ramp signal to form a control signal to control the pass transistor wherein the control signal varies responsively to the ramp signal and the output voltage at a rate that is independent of the current flow through the pass transistor and wherein the pass transistor controls the output voltage to increase with time at a rate that is independent of a load connected to receive the output voltage and wherein the hot swap in-rush limiter is configured to limit a rate of increase of the output voltage to no greater than a rate of increase of the ramp signal.

8. The method of claim 7 wherein configuring the hot swap in-rush limiter to use the ramp signal includes configuring the pass transistor to linearly increase an amount of an input voltage that the pass transistor couples to the output voltage.

9. The method of claim 8 further including configuring the hot swap in-rush limiter to increase the amount of the input voltage that the pass transistor couples to the output voltage responsively to the ramp signal.

10. The method of claim 8 wherein configuring the pass transistor to use the ramp signal includes configuring the pass transistor to linearly increase the amount of the input voltage that the pass transistor couples to the output voltage responsively to receiving the input voltage.

11. A hot swap method comprising:

coupling a pass transistor to couple a voltage from a voltage source to an output of an in-rush limiter in order to form an output voltage;

configuring the in-rush limiter to form a ramp signal that is independent of a load current through the pass transistor;

configuring the in-rush limiter to form a control signal that is representative of a difference between the ramp signal and a sense signal wherein the sense signal is representative of the output voltage and wherein a value of the control signal is independent of a value of the load current through the pass transistor;

configuring the in-rush limiter to control the pass transistor responsively to the difference between the ramp signal and the sense signal and to increase the output voltage at a rate that is independent of the load current through the pass transistor including limiting a rate of increase of the output voltage to no greater than a rate of increase of the ramp signal.

12. The method of claim 11 wherein configuring the in-rush limiter to control the pass transistor responsively to the difference between the ramp signal and the sense signal includes coupling an amplifier to receive the sense signal and the ramp signal and to form the control signal that limits the rate of increase of the output voltage.

13. The method of claim 12 including using an output of the amplifier to control the pass transistor to couple the voltage from the voltage source to the output voltage responsively to the control signal.

* * * * *